Dec. 11, 1945.　　C. P. GAIL ET AL　　2,390,702
HYDRAULIC HOIST
Filed July 20, 1942　　5 Sheets-Sheet 1
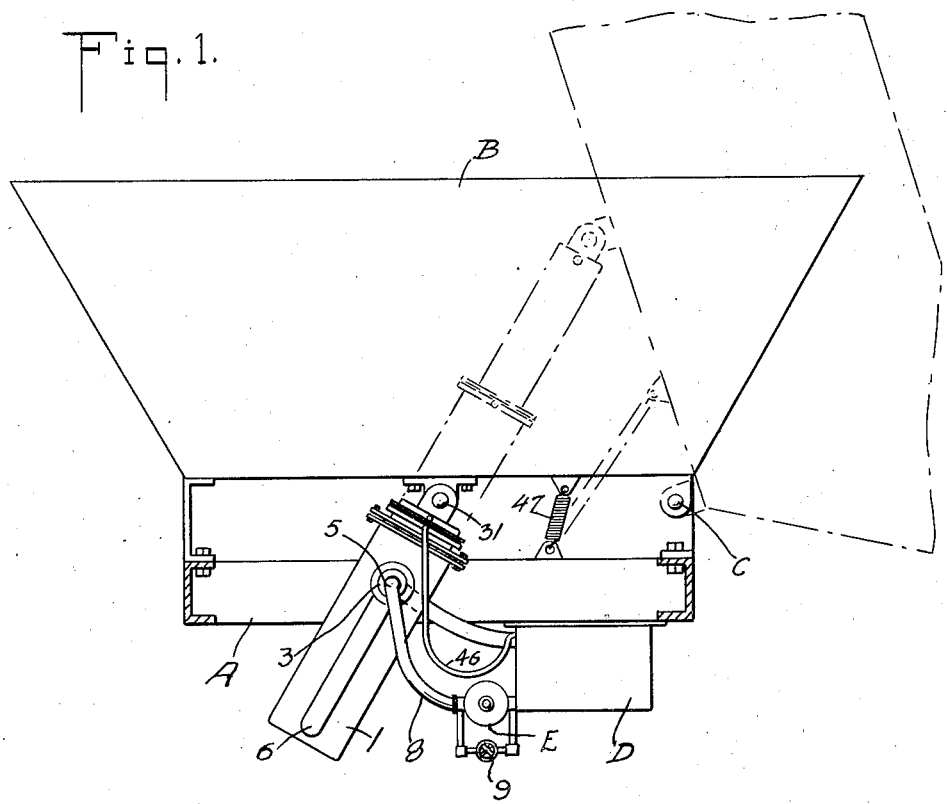
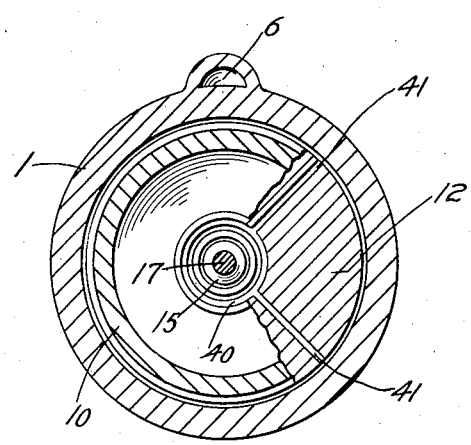
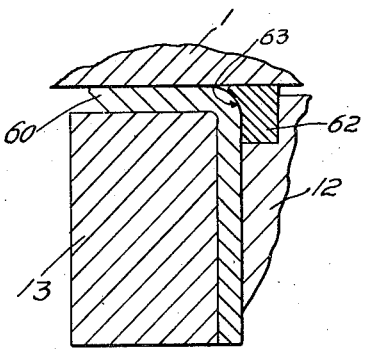
INVENTORS:
C. P. GAIL &
BY　　J. B. KENDALL
THEIR ATTORNEY.

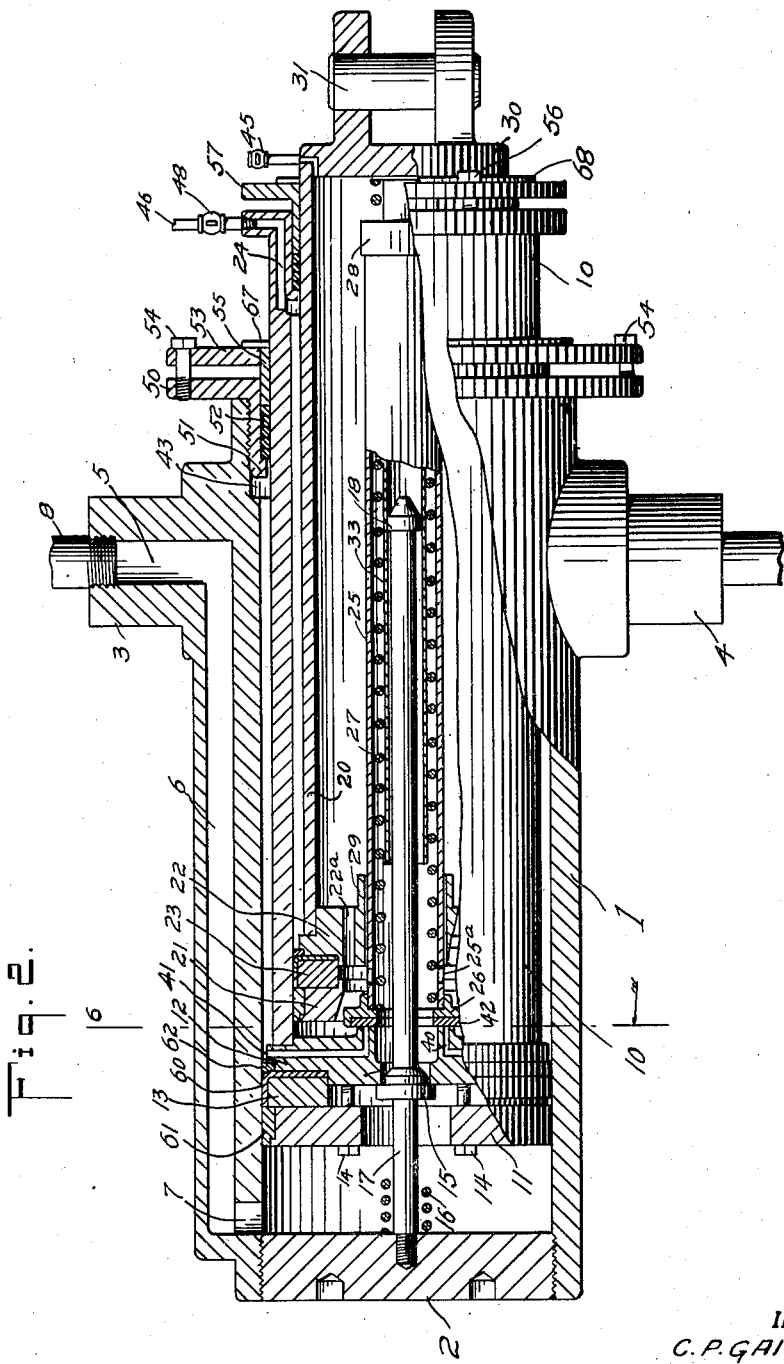

Dec. 11, 1945.　　　C. P. GAIL ET AL　　　2,390,702
HYDRAULIC HOIST
Filed July 20, 1942　　　5 Sheets-Sheet 3

INVENTORS:
C. P. GAIL &
BY　　J. B. KENDALL
THEIR ATTORNEY.

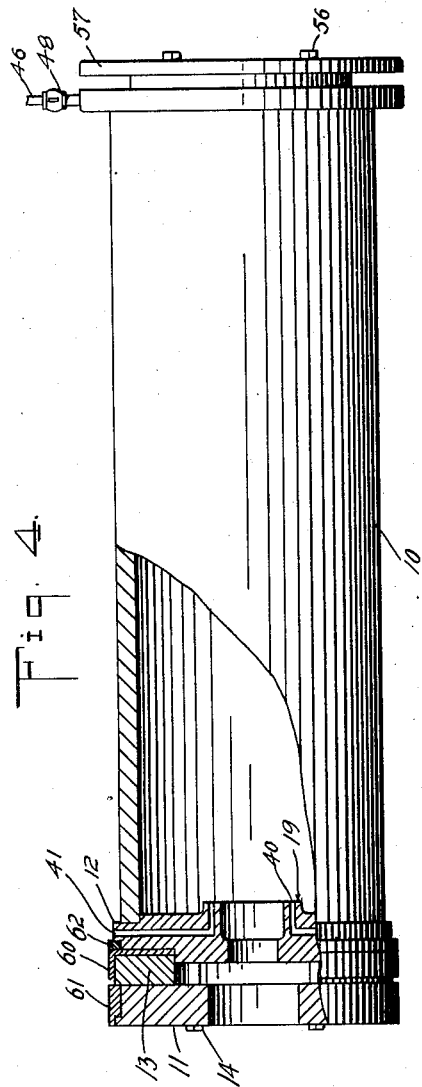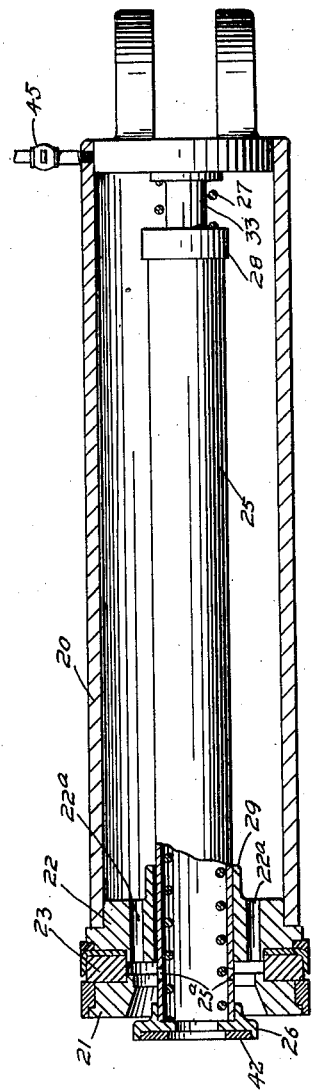

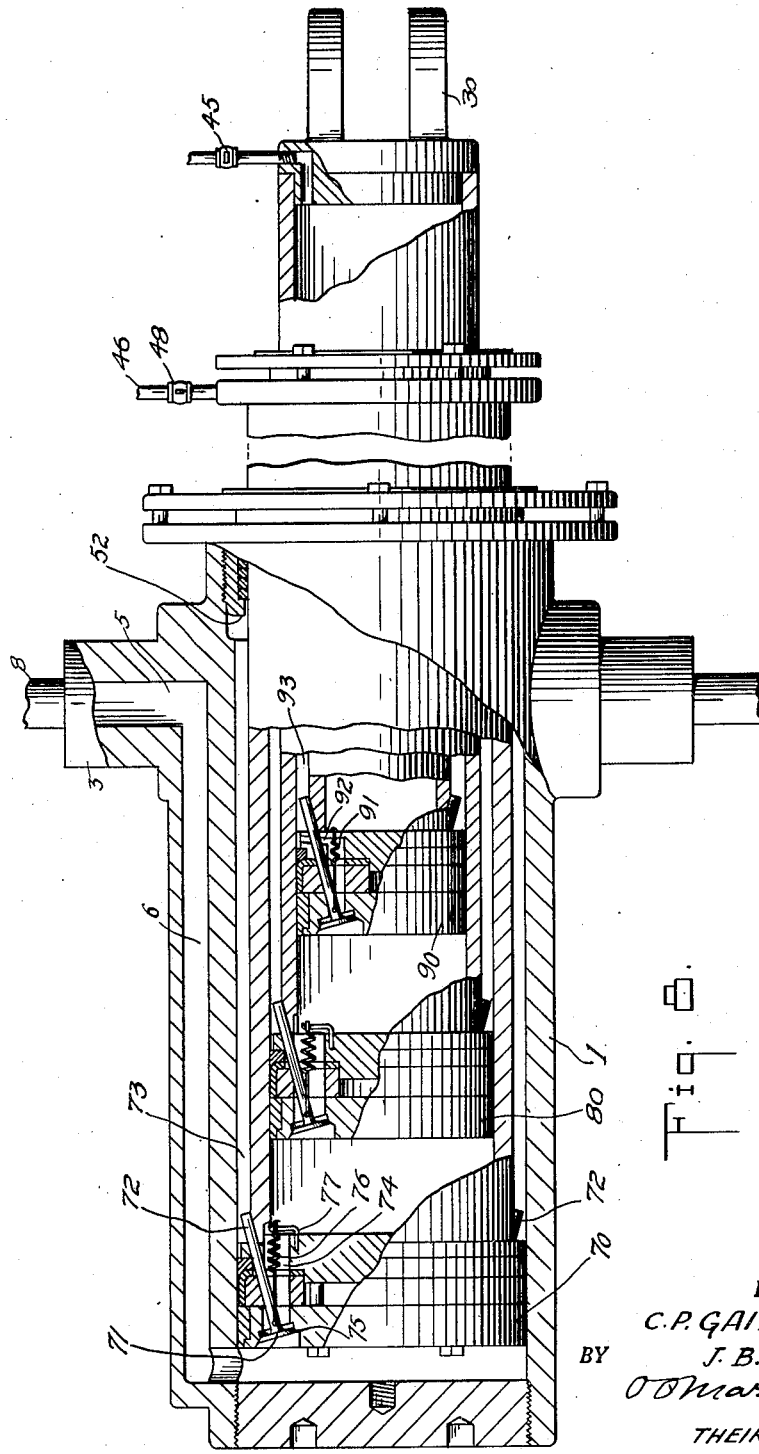

Patented Dec. 11, 1945

2,390,702

UNITED STATES PATENT OFFICE 2,390,702

HYDRAULIC HOIST

Charles P. Gail, Monrovia, and James B. Kendall, Los Angeles, Calif.

Application July 20, 1942, Serial No. 451,674

10 Claims. (Cl. 121—46)

The present invention relates to hoisting apparatus and has particular reference to improvements in hydraulic hoists, such as often used on dump trucks and the like.

It is the general object of the invention to provide a hydraulic hoist of simple and inexpensive construction, convenient to operate and capable of successive extensions to raise heavy loads considerable distances.

With these and other objects in view, as will become clear upon perusal of the description to follow, our invention resides in the combinations set forth in said description and illustrated in the accompanying drawings, of which:

Fig. 1 is an end view of a truck body and chassis, partly in section, on which the device of the invention is mounted for the purposes mentioned;

Fig. 2 illustrates a preferred form of the invention, separated from the truck partly shown in Fig. 1 and with parts broken away for the sake of clearness;

Figs. 4, 5 and 6 are various views of interior parts of the device detached therefrom;

Fig. 7 is an enlarged view of a detail of construction; and

Fig. 8 illustrates certain modifications of the valve mechanism of the device.

Figure 3:
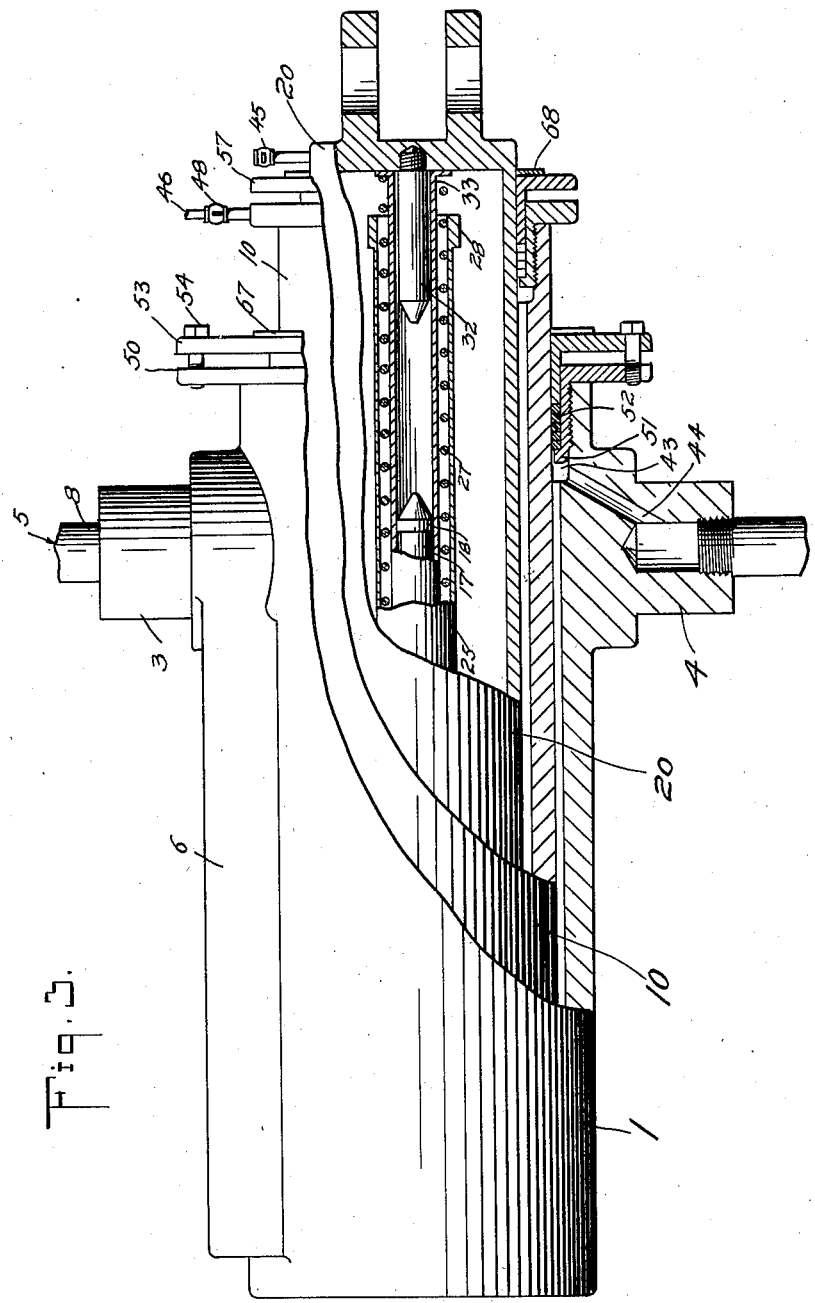
Fig. 3 is substantially a repetition of Fig. 2, but with other parts thereof broken away in order to facilitate reading of the drawings.

The hoist of the invention, in the form illustrated in the drawings, comprises a cylindrical casing 1, which is shown tightly closed at the rear end by means of a screw plug 2 and it is, intermediate its ends, fitted with trunnions 3, 4, on which it is mounted to swing on the chassis A of a dump truck. The trunnion 3 is perforated to form an inlet passage 5, and it is noticed that a conduit 6 extends axially along the outer surface of the casing to pass the hoisting fluid through a port 7 into the interior of the casing.

A tubular piston 10 is fitted to slide within the casing in a manner which will hereinafter be fully described, and a second piston 20 is, in like manner, fitted to slide within the piston 10. In the front end of the inner piston 20 is tightly fitted a head 30, and this head is perforated to receive a pin 31, to which the body B of the dump truck is pivotally connected. The truck body is in any suitable commercially well known manner mounted to tilt on the chassis A, as by pivoted means C.

A tank D, forming a reservoir for the hoisting fluid, is suitably mounted on the chassis, and it is fitted with a pressure pump E from which a conduit 8 carries the fluid to the inlet 5 of the trunnion 3. The pump E is in any suitable manner, not shown, connected for operation by the engine of the truck.

Ordinarily, the truck body is not tilted, but it takes the position shown in full outline in Fig. 1, and the device of the invention is, in this position of the truck body, fully collapsed. It will now be described how the device functions, upon starting pump E, first fully to extend the outer piston 10 and then to commence extending the inner piston. To this end, reference is invited to Figs. 2 and 3, in which the outer piston, for the sake of clearness, is shown partly extended, and the inner piston still is fully collapsed.

As above stated, the pressure fluid enters the casing through the port 7, behind the piston 10, gradually to advance this piston. The head of the latter comprises three main parts, namely a base 11, a valve plate 12, and a spacing member 13, see also Fig. 4. These parts are rigidly combined by means of bolts 14, and they are shown axially perforated to provide a passage there-through for the pressure fluid. However, it is important to note that this passage is controlled by a valve 15, which is held closed by a spring 16 while the piston remains fully collapsed, and that the valve is maintained closed by the pressure of the hoisting fluid during the advance movement of the piston.

A centrally positioned rod 17 extends axially from the base 2 to form a guide for the valve 15 and the spring 16, and an annular shoulder 18 is rigidly secured to the front end of this rod to form a stop for the movement of the valve 15 at the end of the outer piston stroke, the result being that this valve becomes withdrawn from its seat as the piston reaches the end of its movement.

The head of the inner piston 20 also mainly comprises three annular parts, a base plate 21, a ported plate 22, and a spacing member 23, all held tightly assembled by bolts as in the case of piston 10. A tubular guide 25 is fitted to slide within a projecting sleeve 29 of the plate 22, and it terminates at the rear end in an annular valve head 26. A spring 27 urges the guide 25 rearwardly to maintain this valve head pressed against a seat 19 of the valve plate 12.

When the valve 15 opens at the end of the outer piston stroke, as above explained, it is seen that pressure fluid is free to pass through the central bore of the valve head of the other piston, passages 25a of the guide 25, an annular space between the members 21, 22 and passages 22a of the latter, into the space behind and within the inner piston 20 to cause the latter to advance, but because the tubular guide 25 and the valve head 26 by the spring 27, is urged rearwardly, it is seen that the valve 26 is held pressed against its seat thereby to prevent escape of the pressure fluid from within the piston. In view of the foregoing, it is seen that the valve 26 functions solely as a relief valve for passing pressure fluid from the outer cylinder 10 and the inner cylinder 20 at the end of the outer piston stroke, to an annular chamber 43. It is noticed that an annular shoulder 28 is secured to the front end of the guide 25, and it is important to note that this shoulder is engaged by the sleeve 29, when the inner piston reaches the end of its forward stroke, slightly to advance the guide 25, and valve head 26, against the tension of the spring 27, thereby to withdraw the valve 26 from its seat.

The valve seat 19 is shown made with an annular recess 40, from which passages 41 extend radially through the valve plate 12, see also Figs. 4 and 6. The inlet to this recess is held tightly closed by an annular gasket 42, but it becomes uncovered when the guide tube 25 and the valve head 26 are drawn away from the seat 19, as aforesaid. The pressure fluid within the inner piston 20 is now free to flow through the recess and the passages 41 to the space surrounding the piston 10, thereupon to flow into the annular chamber 43, and through a passage 44 of the trunnion 4 back into the tank D. When it is remembered that the outer piston 10, during the entire advance movement of the inner piston, has remained in fully advanced position, it is seen that the radial passages 41, in this position of the piston 10, are alined with this annular chamber to permit free flow of the fluid back into the tank, thereby to relieve pressure within the pistons.

Without such pressure relief, it is found that pressure continues to build up within the device, should the operator fail to stop the pump, until some part of the device would become damaged or destroyed. This fully automatic safety device is therefore of the greatest importance. It is also important to note that this relief mechanism, as well as all the features above described are held confined within the walls of the device. It is also to be noted that a by-pass is provided in the conduit 8, and that a normally closed valve 9 is cut into this by-pass.

After the dumping is completed and the pump stopped the operator opens this valve to relieve the pressure within the pistons and, it is found that the truck body, aided by a spring 47 returns to its horizontal position, and, in returning, collapses the two pistons. The pressure within the pistons, created by the return movement of the latter, is sufficient to maintain the valve 15 open. The fluid, for this reason, is free to flow back into the tank D through the passages just described.

It has been assumed, for the purpose of the foregoing description, that all space within the device, in its initial collapsed position, is occupied by the pressure fluid. However, because only air is present before the fluid is introduced, it becomes necessary to permit this air to escape as the inflowing fluid gradually fills this space, in order that the device may be safely and successfully operated to tilt and dump heavy loads. A valve 45 is, for this purpose, placed at the forward end of the piston 20, and this valve is, preferably before the device is joined to the truck body, manually opened, whereupon the pump is started to cause the pistons to advance one at a time, as explained. When the pressure fluid commences to leak through this valve, it is indication that the air has been expelled, and the valve must then again be closed.

The foregoing brief description covers the operation of the device which, it is noticed, is entirely automatic. No less important is the pressure relief at the end of the advance stroke of the pistons, and the fact that this feature not only is completely automatic but also entirely confined within the casings of the device.

Structurally, the device of our invention embodies various important and novel features, as will now be pointed out. It is noticed that the casing 1 at the forward end thereof, is fitted with an annular flange 50, the inner end of which terminates in an annular shoulder 51 against which the valve plate 12 comes to a positive stop when the outer piston 10 reaches the end of its advance stroke. Behind this shoulder is placed suitable packing 52 and a gland 53 is, by means of bolts 54, seated to maintain this packing tightly in place, thereby to eliminate all danger of leakage at this point. Because this gland also forms the outer bearing for the piston, it is well to make the inner portion 55 thereof from suitable bearing material.

A gasket 60 is shown placed between the member 12 and the annular spacer 13 to assure tight fit of the piston 10 within the casing 1, and an annular member 61, of bronze or other preferred bearing material, is shown placed between the base 11 and the spacer 13 to insure proper bearing surface at this point. It is also important to note that a ring 62 is placed in a recess of the valve member 12. This ring is made with a circular seat 63, which conforms to the shape of the gasket 60 and thereby serves to protect the gasket against forces tending to crush the gasket at this point. See also Fig. 7.

The annular space between the two pistons is filled with pressure fluid while the device is in collapsed position, and it becomes necessary to provide means for the escape of this fluid as the pistons advance. A passage 24 is, for this purpose, made through the front end of the piston 10, and a conduit 46 extends therefrom to the tank D. It may be well to place a valve 48 in this conduit in order that this passageway be stopped in case, due to excessive wear, the fluid can leak past the gasket 60 and the bearing member 61.

The instrumentalities just described are introduced and arranged as shown for the purpose of supporting the outer piston within broad bearings, and in order to provide a rigid and positive stop for its forward movement. Particular attention is directed to the location of the bearing rings 55 and 61, at the very end of the casing 1 and the piston 10, respectively, and to note that they are so placed in order to provide the longest possible bearing surface for the piston. The inner piston 20 may be supported and fitted within the outer piston in like manner and, because it is shown so supported and fitted, it is not thought necessary to burden this description with a repetition of the devices, but a mere glance at the drawings should suffice to enable those versed in this art to duplicate this preferred construction.

While the device of our invention will serve over extended periods of time without special attention, so long as sufficient pressure fluid is present for the purposes of operation, it is still of great importance to provide a mechanism which may be quickly dismantled without the use of special tools or equipment, and as readily reassembled. In the present case, it is merely required to remove the hinge pin 31 and to unscrew the bolts 54, whereupon both pistons may be removed bodily. If, on the other hand, it is desired to remove the inner piston only, it is merely required to withdraw the bolts 56 and the packing gland 57, whereupon this piston may be withdrawn. In either case, the parts withdrawn may then be taken to a convenient place for examination and servicing.

A device of the above described character is subjected to great strain during its advance movement to tilt a heavily loaded truck body and it is, for this reason and as above explained, important to space the outer bearing members 55, 61, which receive the impact of this strain, apart as far as possible. To further strengthen the structure, and also better to guide the spring 27, a pilot rod 32 may be mounted to extend rearwardly from the head 30 in continued alinement with the pivot rod 17. And a sleeve 33 may be added to encompass these rods and better to guide this spring. It is also well to provide at the forward end of the casing 1 and the outer piston 10 annular gaskets 67, 68 of soft material, such as felt or rubber, to bear against the outside piston surfaces so as to prevent dirt and grit from entering the bearing surfaces.

While the device of our invention is primarily intended for use on dump trucks, the scope of its utility is not so limited, but it may be employed to perform other lifting operations. For dump truck operation, it has been found sufficient and also preferable to employ the two pistons 10 and 20, but for other purposes, as where greater extension of the device is required without increasing its overall length in collapsed position, it becomes necessary to increase the number of pistons used.

This may be done without sacrificing the advantageous features of the invention by modifying the construction and arrangement of the valve mechanisms, and such modified device is illustrated in Fig. 8 and will now be described. The casing 1 may remain as above described to support a piston 70 which, except for the valve mechanism, may remain unchanged. Where a greater number of pistons are to be fitted within the casing, it becomes necessary to leave the axial portion of the device unobstructed and to mount the valves in or near the outer walls of the pistons.

A valve 71 is, for this reason, shown placed near the outer wall surface of the piston, and this valve is arranged at an acute angle relative to the piston axis in order to cause the end of the valve stem 72 to project beyond the piston wall into the annular space 73 between the piston and the casing 1. The valve controls a passage 74 through the piston head and it is held normally pressed against its seat 75 by means of a spring 76. The latter is suitably anchored within the piston head, as by a pin 77.

In operation, the piston is advanced in the manner above described, and it is noticed that the end of the valve stem 72 comes to a stop against the casing shoulder 52 as the piston reaches the end of its forward movement, thereby to open the valve for the pressure fluid to enter behind the second piston 80. The latter may be constructed identically like the piston 70 but it is, of course, of smaller diameter in order to find its place therein. Additional pistons may be added in the same manner, only that each succeeding piston must be of correspondingly smaller diameter.

The valve mechanism of the innermost piston 90, in which the head 30 is fitted, differs from the foregoing only in one respect, namely that the passage 91 does not extend all the way through the piston head, but that it communicates through a passage 92 with the annular space 93 surrounding the piston. This construction is necessary in order to relieve pressure within the device in case the operator should fail to stop pump when all the pistons are fully advanced. In other words, the valve mechanism of this piston is somewhat modified in order to cause it to function like the piston 20 of the first described device.

Where sufficient space is available for installation of a relatively large valve, only one valve may be required in each piston freely to pass the pressure fluid. Otherwise it may be found advisable to place additional valves in each piston, as indicated in the drawings. This modified device is simpler than the hoist of Fig. 2 and, although not so sturdy, may be found equally satisfactory, particularly where the device is not mounted for oscillating movement as is necessary in dump truck installations and for which reason the hoist of Fig. 2 is mounted on the trunnions 3, 4.

While we have in the foregoing described the preferred forms of our invention illustrated in the drawings, we do not wish to be limited to the exact constructions shown, but reserve the right to embody such further modifications as will come within the scope of the claims hereto appended.

We claim:

1. A hydraulic hoist comprising, a casing, an outer piston axially slidable within the said casing, pressure fluid, means forcing said fluid against said piston to advance the latter through the casing, a pilot axially extending through the center of said casing, a valve in said piston axially slidable on said pilot and held closed by pressure of the pressure fluid, an inner piston slidable within said outer piston, and a stop on said pilot for checking the movement of said valve at the end of the outer piston advance stroke thereby to cause said valve to open and to admit pressure fluid to the inner piston.

2. A hydraulic hoist comprising, a casing, an outer piston axially slidable within said casing, pressure fluid, means forcing said pressure fluid against said piston to advance the latter through the casing, a pilot axially extending through the center of the casing, a valve in said piston axially slidable on said pilot, a spring urging said valve into closed position before start of the piston advance movement, the pressure of the pressure fluid maintaining said valve closed and advancing with the piston, an inner piston slidable within said outer piston, and a stop on said pilot for checking movement of said valve as the outer piston reaches the end of its forward stroke thereby to cause the valve to open and to admit pressure fluid to said inner piston.

3. A hydraulic hoist comprising, a cylindrical casing closed at one end, an outer piston having an annular valve seat and being axially slidable within the casing, pressure fluid, means forcing said fluid against said piston to advance the latter through the casing, a pilot axially extending from the closed end of the casing through the axial center thereof, a valve in said piston axially slidable on said pilot, the pressure of the fluid maintaining said valve on the annular seat of the piston, an inner piston slidable within said outer piston, and a stop on said pilot for checking movement of said valve as the outer piston reaches the end of its forward stroke thereby to cause the valve to rise from its seat and to admit pressure fluid to said inner piston.

4. A cylindrical hoist comprising, a casing closed at the bottom, an outer piston slidable within said casing, means carrying fluid under pressure to the casing below said piston, the piston being made with a perforated head having a lower and an upper annular seat, a pilot axially extending from the casing bottom and terminating in a shoulder, a valve slidable on said pilot and maintained by fluid pressure against said lower seat, an inner piston slidable within said first piston and closed at the top, a coaxial sleeve within said inner piston terminating at the bottom in an annular valve and at the top in a shoulder, means urging said sleeve downward to maintain said annular valve against the upper seat of the outer piston, an annular shoulder rising from the head of the latter to strike the shoulder of said sleeve thereby to withdraw the sleeve valve from its seat, and passages through the sleeve, the outer piston head and the casing for discharging the pressure fluid when the sleeve valve rises from its seat.

5. A hydraulic hoist comprising, a casing closed at the bottom, an outer piston slidable within said casing, means carrying fluid under pressure to the casing to advance said piston, the latter being made with a perforated head having a lower and an upper seat, a pilot rising from the casing bottom coaxially with said seats and terminating in a shoulder, a valve slidable on said pilot and maintained by fluid pressure against said lower seat, an inner piston slidable within the outer piston and closed at the top, a coaxial sleeve within the latter terminating at the bottom in an annular valve and at the top in a shoulder, a sleeve extending downward from said inner piston top to guide said pilot, means between the two sleeves urging said first named sleeve downward to maintain said annular valve against the upper seat of the outer piston, an annular shoulder rising from the head of the inner piston to strike the shoulder of said sleeve thereby to withdraw the sleeve valve from its seat, and passages through the sleeve, the outer piston head and the casing for discharging the pressure fluid when the sleeve rises from its seat.

6. In a hydraulic hoist, a casing, a pilot axially rising from the base of said casing, an outer piston fitted to slide within said casing, said piston having upper and lower valve seats, means carrying fluid under pressure to the casing to advance said piston therein, an inner piston slidable within said outer piston, a valve axially slidable on said pilot and held by fluid pressure against said lower valve seat, means withdrawing said valve from its seat at the end of the outer piston advance stroke to admit fluid into the inner piston, a second valve coaxial with said first named valve, means maintaining said second valve on the said upper valve seat, means for raising the second valve from its seat thereby to open a discharge passage for the pressure fluid at the end of the inner piston advance stroke.

7. In a hydraulic hoist, a casing, an outer piston having its head fitted to slide within said casing, the piston being reduced in diameter above its head to form an annular discharge chamber and having a passage axially through its head, a guide rod rising from the base of the casing through said passage, a valve slidable on said rod to close the passage, means forcing fluid against said head and valve to maintain the latter closed, an inner piston fitted to slide within said outer piston, means on said rod for opening said valve at the end of the outer piston advance stroke to admit fluid to the passage, an annular seat in the piston head above and coaxial the passage, discharge passages from said seat to said discharge chamber, a coaxial sleeve within said inner piston having ports for passing fluid from the passage to the space within the inner piston, said sleeve terminating in an annular valve closing said discharge passages, means within the sleeve urging said annular valve against its seat, and a shoulder on the sleeve engageable by the advancing inner piston to raise the sleeve and uncover said discharge passages.

8. A hydraulic hoist comprising, a casing, an outer piston axially slidable within said casing, said piston having a passage axially through its head, means forcing fluid under pressure into the casing to advance the piston, a valve in the piston head passage held closed by fluid pressure, an inner piston slidable within said outer piston, means axially rising from the casing base through said passage for checking the advance movement of said valve with the piston as the latter reaches the end of its advance stroke thereby to cause the valve to open and to admit fluid through said passage, an annular seat in the outer piston head coaxial with said passage, discharge passages from said seat, a coaxial sleeve within the inner piston having ports for passing fluid from said passage to the space within the inner piston, said sleeve terminating in an annular valve normally closing said discharge passages, means within the sleeve urging said valve against said annular seat, and a shoulder on said sleeve engageable by the advancing inner piston to move the sleeve axially thereby to open said discharge passages for discharge of the fluid.

9. A hydraulic hoist comprising a storage tank, a casing, an outer piston having at the bottom an annular head fitted to slide within said casing, an inner piston axially slidable within said outer piston, means carrying fluid under pressure from said tank to the casing below the outer piston, an inlet valve seated against the passage through said annular head to check upward flow of pressure fluid therethrough, a guide rod axially rising from the base of the casing, said rod having an annular shoulder engageable by said inlet valve to withdraw said valve from its seat at the end of the outer piston advance stroke to admit fluid into said inner piston, fluid discharge ducts through said valve head, a relief valve seated against the upper surface of said valve head to close the passage through the head and the said discharge ducts, and means for opening said relief valve at the end of the inner piston advance stroke for discharge of pressure fluid from the inner piston through said ducts to said storage tank.

10. In a hydraulic hoist having a storage tank, a casing closed at the bottom and having a bearing seated in the upper end thereof, an outer piston fitted to slide within said bearing and having an annular head at the bottom fitted to slide within the casing, an annular chamber being thereby formed between the piston and the casing wall, a fluid discharge passage from said chamber to said storage tank, an inner piston slidable within said outer piston, a bearing within the upper end of the outer piston, said inner piston having at the bottom an enlarged annular head fitted to slide within the outer piston until stopped by the bearing of the latter, a guide rod axially rising from the casing base through the piston heads, a coaxial annular valve seated in the passage through said outer piston head to close the entrance to the inner piston, bypasses through the outer piston head from the space within said inner piston to said annular chamber, a coaxial annular valve closing said bypasses, means forcing fluid from said storage tank into the casing to advance said outer piston until stopped by the casing bearing, means on said rod for opening said entrance closing valve at the end of the outer piston stroke thereby to admit fluid to the inner piston, and means for opening said bypass valve at the end of the inner piston stroke to pass the fluid through said annular chamber and discharge passage back to the storage tank.

CHARLES P. GAIL.
JAMES B. KENDALL.